INVENTOR
Marie A. P. E. P. Diederich

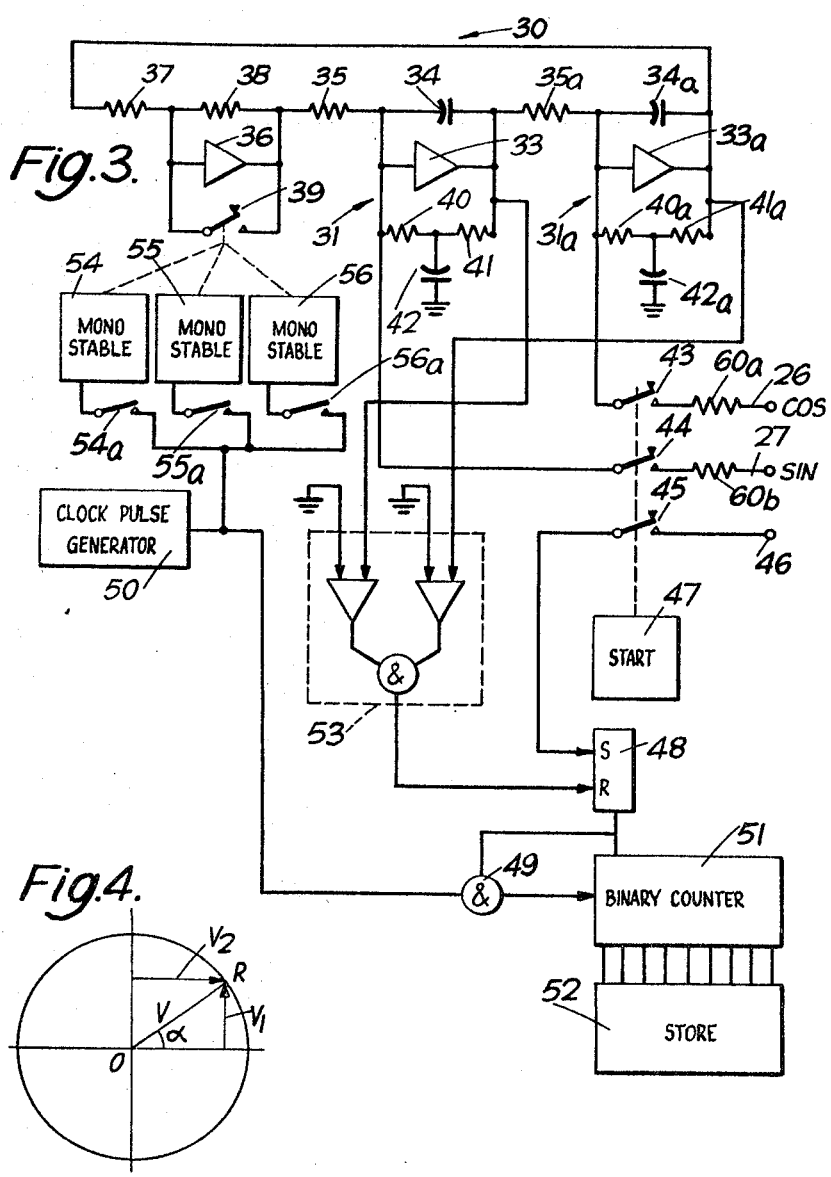

United States Patent Office 3,447,156
Patented May 27, 1969

3,447,156
RECEIVERS FOR PHASE COMPARISON RADIO NAVIGATION SYSTEMS
Marie Alphonse Paul Eugene Pierre Diederich, London, England, assignor to Decca Limited, London, England, a British company
Filed Jan. 25, 1968, Ser. No. 700,418
Claims priority, application Great Britain, Feb. 1, 1967, 4,899/67
Int. Cl. G01s 1/32
U.S. Cl. 343—105      12 Claims

ABSTRACT OF THE DISCLOSURE

A receiver for a phase comparison navigation system in which receiver analogue signals representing the sine and cosine of a phase angle are converted into a digital signal. The analogue signals are applied to set the voltage levels at the respective inputs of two integrating operational amplifiers in tandem, an oscillatory loop containing the amplifiers being completed by an inverter. The loop is allowed to oscillate, a digital counter being arranged to count an increment for each incremental change in the phase of the oscillation. The counting is stopped at a predetermined phase in the oscillation, whereupon the number counted by the counter is proportional to the phase angle or is simply related thereto. Clock pulses, which need not be at a regular frequency, are counted by the counter and trigger a monostable which permits oscillation of the loop for a present time. The monostable period is chosen so that the digital count represents the phase angle expressed in terms of a lower frequency.

---

This invention relates to receivers for phase comparison radio navigation systems and particularly to the conversion, in such receivers, of electrical analogue signals that represent the sine and cosine of an angle into a digital signal $n$, wherein the ratio of $n$ to N where N is larger than $n$ represents digitally the ratio of said angle (expressed in radians) to $2\pi$.

In order that the purpose of the present invention may be fully appreciated, its use in a specific context will first be described and explained.

One of the most important and most widely used of present day navigational aids is the phase comparison radio navigation system known as the Decca Navigator. "Decca" is a registered trade mark. The main features of this system are described, for example, in our British patent specifications Nos. 620,479 and 765,573. This navigation system employs a master station and, preferably, three slave stations spaced apart from one another and from the master station, the slave stations being known respectively as the red, green and purple slaves. Radio signals of different but harmonically related frequencies are radiated from all the stations and a mobile receiver is arranged to compare in phase a signal received from each slave station with the signal received from the master station. Each phase comparison between a signal from a slave station and the signal from the master station yields a phase angle which represents the difference in distance of the receiver from the master station and the respective slave station and defines the position of the receiver as lying on one of a family of hyperbolic position lines, which family has the two stations whose signals are compared at its foci. In the particular system mentioned, during normal transmission periods the master station radiates signals of $6f$ where $f$ is a fundamental frequency typically in the region of 14 kc./s. and the red, green and purple slave stations radiate respectively signals of $8f$, $9f$, and $5f$ kc./s. All the radiated signals are locked in phase and are radiated substantially continuously. For very short periods of a fraction of a second at intervals of several seconds, the transmissions from all the stations are interrupted and during the first interruption period signals of all four frequencies are radiated from the master station. After a further period of normal transmission there is a second interruption period during which signals of all four frequencies are radiated from the red slave station. This is followed by a further period of normal transmission followed by an interruption period during which all four frequencies are radiated from the green slave station and after a further period of normal transmission all four frequencies are radiated from the purple slave. There is then a period of normal transmission, longer than the periods between the aforementioned interruptions, before the cycle recommences.

During a period of normal transmission a phase comparison between, for example, the $6f$ master station signals and the $8f$ red slave signals is made by bringing the $6f$ and $8f$ signals to a common comparison frequency ($24f$) and then applying the signals at this frequency to a phase discriminator producing two D.C. potentials proportional respectively to the sine and cosine of the phase angle $\alpha$ between the inputs to the phase discriminator. The angle $\alpha$ defines one hyperbolic position line through the location of the mobile receiver. A similar comparison at $18f$ and $30f$ may be made during other normal transmission periods for the signals from the green slave and the master station and from the purple slave and master station respectively. By computing the intersection of two of the hyperbolic position lines obtained by the phase comparisons the position of the mobile receiver may be determined. It will be appreciated that each determined position line in each family is ambiguous that is to say each phase comparison defines a plurality of position lines whose hyperbolic coordinates, i.e. the associated phase angles differ by integral multiples of $2\pi$. By utilising the multi-frequency transmissions in the interruption period however, it is possible, as is described in our prior British patent specification No. 765,573, and elsewhere, to make a further phase comparison, for each pair of stations, at a lower frequency such as $1f$. Within the range of coverage of the radio navigation system, the position line thus obtained is normally unambiguous and gives a coarse indication of the respective hyperbolic co-ordinate. The accurate value of this co-ordinate is obtained by the phase comparison at the higher comparison frequency in the manner just described and, using both coarse and fine phase comparisons, an accurate and unambiguous indication of the position of the receiver may be determined. Details of how these comparisons may be made are to be found in the aforementioned specifications Nos. 620,-479 and 765,563. For the present purposes, it is important to note that the result of a phase comparison is essentially two electrical analogue signals, such as voltages, respectively representing in magnitude and sign the sine and cosine of an angle. Many receivers for the system described above utilise these analogue voltages to drive phase angle meters, commonly known as decometers, which can be used in conjunction with a pre-prepared chart bearing hyperbolic lattices to determine the position of the mobile receiver. Since such receivers are reliable and accurate it is undesirable that they should lightly be replaced by complex and expensive apparatus.

However, the requirements of the user may be that an automatic chart display be driven from the aforementioned analogue signals produced by the receiver. Such an automatic display may take the form described in the specification of our British Patent No. 914,185, but many other forms of automatic chart display might be used. Modern automatic chart displays operate digitally and it is therefore necessary to be able to convert the analogue signals derived from the aforementioned phase comparisons to digital signals. More generally, the analogue signals may need to be converted into digital signals for use in digital computing apparatus which is to process the information obtained from the phase comparisons. The present invention facilitates this conversion.

Alternatively, the receiver for the radio navigation system may be associated with other navigational aids which operate according to digital techniques and it may be desired to co-relate information from the hyperbolic phase comparison navigation system with information derived by other means in order to verify the position of the mobile receiver.

Another important use of the present invention must yet be considered before its nature is particularly described. In use at the present time are receivers which use the transmissions from spaced transmitting stations in the form described above, but present the hyperbolic or phase angle information in a fundamentally different form. To take one example: when the master and red slave signals are brought to a common comparison frequency, the master signals may be converted into a pulse train which consists of sharp spikes. The red slave signals may be converted in similar fashion but it will be apparent that the pulse trains will be staggered that is to say pulses from the two trains will not occur simultaneously: there will be a time difference between a pulse in the "master" pulse train and the next succeeding pulse from the "red" pulse train. It will be appreciated that the ratio of the time between the occurrence of a pulse in the master train and the next succeeding pulse in the slave train to the time between successive pulses in the master train is representative of the phase angle between the master and slave signals. It will also be appreciated that similar sets of pulse trains at appropriate frequencies may be derived to obtain phase information between the master station and another slave station. The information contained in the pulse trains is utilized in a fundamentally different manner to that in which the analogue signals are used. Instead of the signals being used to drive decometers, the information contained in the pulse train is normally directly converted into digital form. By providing a binary counter which is arranged to count to a number N in the time between successive pulses in the master train, starting the counter when a pulse in the master train occurs and stopping the counter when the next succeeding pulse in the slave train occurs, it will be seen that the number $n$ contained in the counter is such that $n/N = \alpha/2\pi$ where $\alpha$ is the phase angle between the master and slave signals. The number $n$ contained in the digital counter may be staticised or otherwise read out for use in the digitally operated apparatus as described briefly hereinbefore. The present invention facilitates the use of computing apparatus, arranged to process positional information obtained from the aforementioned phase comparisons, with receivers presenting the positional information in either of the forms (that is, analogue or pulse train) described above.

The present invention utilises what will be called hereinafter a "rotor circuit." It is known in analogue computing apparatus to form a closed oscillatory loop comprising two integrators (or differentiators) connected together in series with an inverter. Where V is the output voltage of one of the integrators (where two integrators are used), the differential equation expressing the behaviour of the circuit is given by $$V_1 = \frac{-k}{T_1 T_2} \frac{d^2 V_1}{dt^2}$$

where $t$ represents time, $k$ is the gain of the inverter and $T_1$, $T_2$ are the time constants of the integrators. The above equation has an oscillatory solution $V_1 = V \sin(\beta t + \theta)$ where $$\beta = \left(\frac{k}{T_1 T_2}\right)^{1/2}$$

The output from the other amplifier is $$V_2 = \pm V \cos(\beta t + \theta),$$

the sign depending on the position of the inverter in the loop. The outputs $V_1$ and $V_2$ can be set to any desired levels, which levels thereafter determine the values of V and $\theta$ when the rotor circuit is allowed to oscillate. One way of setting the voltage levels is to provide for each integrator an additional input resistor and an additional resistive feedback circuit, the junction between the additional input resistor and the additional feedback circuit only being connected to the amplifiers input when the desired voltage level is to be set in. By coupling the other end of the additional input resistor to receive a voltage corresponding to a desired initial $V_1$ or $V_2$ (i.e. the sine and cosine signals to be digitised) and making the additional, resistive feedback circuit of such a value that it over-rides the effect of the capacitative feedback of the integrator, the required signals can be set in. Other arrangements, which include disconnecting the feedback capacitors from the summing junctions and charging them to appropriate values are possible: in general however, it is sufficient to provide simultaneously operable switching means for applying the analogue signals to set the voltage levels at the outputs of the integrators (or differentiators).

In this specification the term "rotor circuit" will be used to mean a pair of integrators (or differentiators) arranged in series with an inverter to form a closed oscillatory circuit, which circuit includes means for applying two direct voltage signals separately to points in the circuit in order to set the voltage level at the output of each integrator (or differentiator) proportionately to the amplitude of a respective one of said sine and cosine signals.

According to one aspect of this invention, in a receiver for a phase comparison radio navigation system, which receiver includes phase discriminating means and is adapted to produce, by comparing the phases of received radio frequency signals, two electrical signals representing respectively both in magnitude and sign the sine and cosine of an angle, there are provided a rotor circuit, simultaneously operable switching means for applying said electrical signals to set the voltage levels in the rotor circuit at the outputs of the two integrators (or differentiators), a digital counter, means for starting said counter for counting when said electrical signals are applied to set said voltage levels and means for stopping the counting by the counter when a point in said rotor circuit passes through a predetermined reference condition, the counter and/or the rotor circuit being arranged that each incremental numerical change in the counter corresponds to an incremental change in the phase of the oscillation of the rotor circuit, whereby the number counted by said counter between the starting and stopping of the counting is representative of said angle.

Conveniently the rotor circuit comprises two integrators connected in series with an inverter. The means for stopping the count may include a voltage responsive device such as a comparator arranged to provide an output signal when the voltage at said point in the rotor circuit (which may be the output of the appropriate integrator) passes through a predetermined value.

The predetermined value may be zero. By appropriately arranging the rotor circuit it is readily possible to ensure that, when this condition is reached, the oscillation of the rotor circuit will have changed in phase by $\alpha$, the angle to be digitised. With such an arrangement, the number $n$ counted by the counter between starting and stopping is directly proportional to the angle $\alpha$ represented by the analogue sine and cosine signals.

mitting stations for a phase comparison radio navigation system;

FIGURE 3 is a schematic block diagram illustrating a part of the receiver of FIGURE 2 which embodies the present invention; and FIGURE 4 is a phasor diagram illustrating the operation of a rotor circuit.

Figure 1:
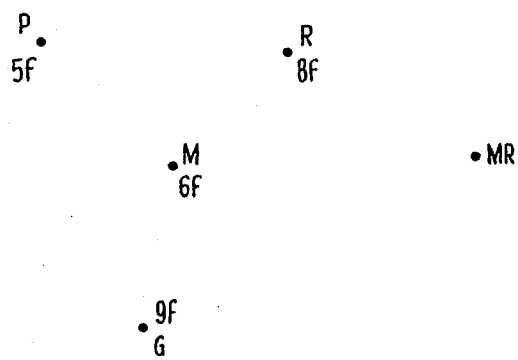

Referring to FIGURE 1, there are shown four transmitting stations spaced apart arranged in a generally star shaped pattern with the master station M near the centre of the pattern and the red, green and purple slaves R, G and P disposed around the master. For present purposes it may be assumed that these stations transmit continuous radio frequency signals. In the particular embodiment to be described, the master station transmits signals at a frequency $6f$ where $f$ is fundamental frequency of the system and the red, green and purple slave stations transmit signals at frequencies $8f$, $9f$ and $5f$ respectively. The frequency $f$ is typically in the region of 14 kc./s. The slave signals are locked in phase to the master signals so that by measurement of the phase relationship at the mobile receiver MR of signals received from the master and a slave station a position line through the position of the receiver is determined. The position line is one of a set of confocal hyperbolae having the master and respective slave station as foci. By using signals from the master and two slave stations, two intersecting hyperbolic position lines may be obtained, thereby defining the location of the receiver. The phase differences which correspond to the position lines are called hyperbolic co-ordinates.

Figure 2:
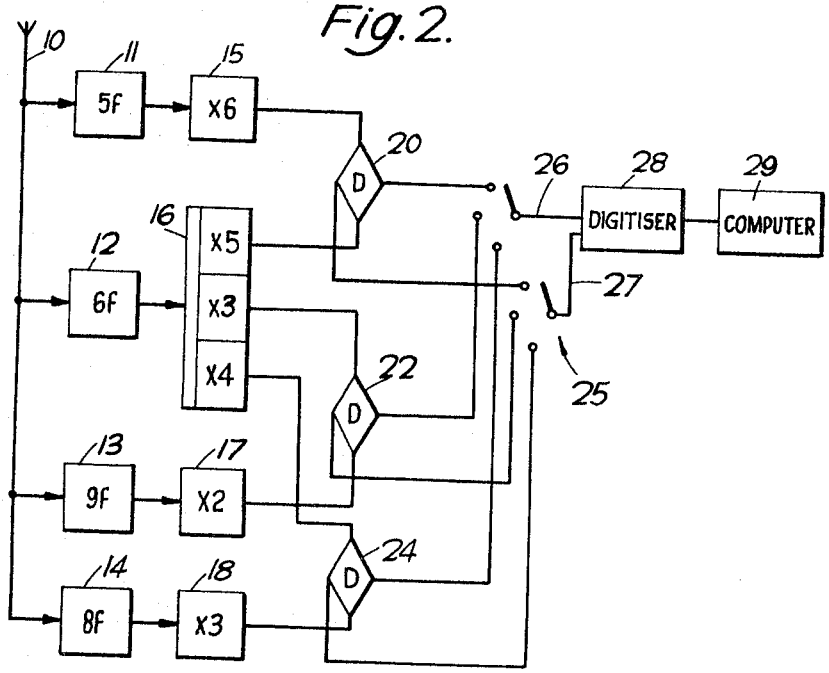
FIGURE 2 is a schematic diagram illustrating a receiver for said radio navigation systems.

In the apparatus of FIGURE 2, to determine the hyperbolic co-ordinates the signals are picked up by an aerial 10 and are amplified by amplifiers 11–14 tuned respectively to the frequencies $5f$, $6f$, $9f$ and $8f$. The output of the amplifiers are fed to frequency multipliers 15 to 18. The frequency multiplier 16 is associated with the $6f$ signal from the master station and separately multiplies the received $6f$ signal by factors of 3, 4 and 5 to provide separate outputs at $18f$, $24f$ and $30f$. The $30f$ output from multiplier 16 is fed to one input of a phase discriminator 20 to the other input of which is fed a $30f$ output from the multiplier 15 which multiplies the received purple slave $5f$ signal by a factor of 6. The discriminator 20 provides two direct voltage outputs representing respectively the sine and cosine of the phase angle between the compared signals at the common comparison frequency $30f$. The $18f$ output from multiplier 16 is fed to one input of a phase discriminator 22 to the other input of which is fed an $18f$ output from the multiplier 17 which multiplies the received $9f$ green slave signals by a factor of 2. The discriminator 22 provides two direct voltage outputs representing the sine and cosine of the phase angle between the master and green slave signals at the common comparison frequency $18f$. A $24f$ output from the multiplier 18, which multiplies the frequency of the received red slave signal by a factor of 3, is fed to one input of a discriminator 24 to the other input of which is fed the $24f$ output from the multiplier 16. The discriminator 24 provides voltage outputs representing the sine and cosine of the "red" phase angle at the common comparison frequency $24f$. The phase discriminators may be of any convenient construction; they may be, for example, of the kind described in British patent specifications Nos. 620,507 and 624,042.

A hyperbolic phase comparison system of the above kind is more fully described in the aforementioned specification No. 620,479 and reference may be made to that specification for further explanation of the construction and manner of operation of such a system. In the system described in the aforementioned specification No. 620,479 these outputs are used to operate phase angle indicating meters. Each complete cycle of phase change represents a comparatively short distance of travel so that phase angle measurement within a cycle gives very accurate positional information typically to a few metres, while counting of the complete cycles or a further phase comparison at a low frequency, for example, $f$ provides coarse, i.e., unambiguous positional information.

In the present invention, the sine and cosine signals are to be digitised for use (for example) within a computer 29 which may effect a co-ordinate conversion of the hyperbolic co-ordinates to cartesian co-ordinates but may in general be constructed to utilise the phase angle information to determine the position of the receiver and the term "computer" is intended to mean any digital computing apparatus which utilises the phase angle information in computations.

For the purpose of determining the position of the mobile receiver, two sets of outputs of the discriminators may be used in the manner described in the aforementioned specifications. The present invention is concerned mainly with the conversion of a (selected) set of outputs from a discriminator into digital form. Separate digitisers could be used for the various sets; in the present instance the outputs from the discriminators are selected by a three pole two position switch 25 and the selected sine and cosine signals fed on lines 26 and 27 to the digitiser 28. The output from the digitiser is fed at an appropriate time to the computer 29.

In FIGURE 3, the cosine signal appears on line 26 and the sine signal appears on line 27; for the purposes of explanation, it will be assumed that there are voltages on these lines equal to $V \cos \alpha$ and $V \sin \alpha$ respectively, wherein $\alpha$ is the phase angle between the master and a slave station signals at the common comparison frequency. At the top of FIGURE 3 is shown a rotor circuit 30 comprising two integrators 31 and 31a connected in series with an inverter (or see-saw amplifier) 32. The two integrators are similar and comprise a high gain amplifier 33 or 33a each having a feedback capacitor 34 or 34a and an input resistor 35 or 35a. Also in an additional, resistive feedback circuit for each integrator are resistors 40, 41, or 40a or 41a respectively decoupled by the capacitors 42 or 42a to earth. The purpose of this feedback circuit will be hereinafter explained and for the present it will be assumed that they have no effect on the operation of the rotor circuit 30 when it is in an oscillation condition. The inverter has an input resistor 37 and a feedback resistor 38 in a feedback loop of a high gain amplifier 36. A switch 39 which when closed short circuits the amplifier 36 is also provided. For the mere digitisation of the sine and cosine signals it is not necessary to operate the switch 39 and for the present it will be assumed that this switch is always open. The switch 39 might be replaced by a series switch at any appropriate point in the loop of the rotor circuit; for example immediately after the resistor 37.

Various ways of setting in the analogue sine and cosine signals to the rotor circuit are possible and a few have been mentioned above. The way shown in FIGURE 3 permits an additional resistive feeback circuit not only to co-operate with an additional input resistor to act as one settable input but also to provide the small current required to provide appropriate bias current for the input circuits of the operational amplifier. Accordingly the input lines 26, 27 are coupled through respective input resistors 60a, 60, through respective switches 43, 44 to the input summing junctions of the amplifiers 31a, 31. There is provided an additional feedback path, comprising resistors 40 and 41 (40a and 41a) for each amplifier 31, 31a. By decoupling the additional feedback paths by the capacitors 42 and 42a the additional feedback paths do not affect the very high Q of the integrators, because the current fed back is small and is shifted by 90° with respect to the output of the corresponding amplifier.

The switches 43 and 44 are ganged for simultaneous operation with a switch 45 when a start circuit 47 is operated. The switch 45, when closed, couples a voltage source 46 to a "set" input of a bistable circuit 48 which, However, other arrangements of the reference value and the rotor circuit are possible. If the rotor circuit were to oscillate in a reverse sense the number $n$ held in the counter when the counter was stopped would be the true complement of the number $n$, that is to say it would be related to $\alpha$ by the equation $(N-n)/N = \alpha/2\pi$. It would be readily possible to convert the true complement into the number required. On the other hand, it may be that the phase angle $\alpha$ were to be subtracted from a number when it was fed into the computing apparatus, in which case the use of the true complement of $n$ instead of the number $n$ itself may be appropriate.

It is also not necessary to stop the counting by the counter where the voltage representing sin $\alpha$ is passing through zero. If for example, a value of $-\pi/2$ were chosen the number counted by the counter may be related to $\alpha$ by the equation $(n-N/4)/N = \alpha/2\pi$. It may well be that the phase angle $\alpha$ would have to be advanced by 90° for use in a computation, in which case such an arrangement would be desirable. There are many possibilities in this respect: it will be apparent that the number counted always represents $\alpha$ and its relationship to $\alpha$ is always predetermined.

Preferably, as mentioned above, the rotor circuit comprises two integrators connected in series with an inverter in a closed loop to form an oscillatory loop. The means for applying said electrical signals to set the voltage levels may include an additional resistive feedback circuit for each integrator and an additional input resistor for coupling a respective one of the electrical signals to the input summing junction of each integrator through a switch, the switches being simultaneously operable. It is possible to arrange for the capacitive feedback circuit for the integrator to be disconnected when the signal value is being set in but by decoupling each resistive feedback circuit (by, for example, coupling its mid point to earth via an appropriate capacitor) it is not necessary to disconnect the integrating capacitor during setting or the resistive feedback during normal oscillation. There may be means associated with said switches to start the counter for counting when said switches are closed.

With the system described above, the period of the rotor circuit (and hence the counting rate) is immaterial provided that the accuracy of the digital number counted is sufficient for computing purposes.

One way of ensuring that each numerical change in the counter corresponds to an incremental change in the phase of the oscillation of the rotor circuit is to permit the rotor circuit to oscillate without interruption after the counter is started and to arrange for the counter to count at a regular rate. For many purposes, however, an alternative way may be adopted. The present invention may include means for alternately stopping and starting the rotor circuit after the inputs have been set so that it intermittently oscillates, the lengths of each period of oscillation being equal and the counter being arranged only to count during said periods and to count an equal number of units (preferably unity) during each successive period of intermittent oscillation of the rotor circuit. This arrangement avoids the use of accurately timed "clock" pulses to operate the counter, and permits the use of periods of non-oscillation of virtually any length, the periods of non-oscillation being, if desired, non-equal. This arrangement also has a more specific advantage when used in receivers for the particular type of navigation system described below. This will now be explained.

It will have been seen from the above that the common comparison frequencies are 18$f$, 24$f$ and 30$f$ for the respective pairs of stations. Although these particular frequencies may be altered, it will be true that in general the common comparison frequencies will be different, though harmonically related. Furthermore, the position lines determined by the hyperbolic co-ordinates are ambiguous and may have to be resolved by making a further comparison at a lower frequency such as 1$f$. A complete cycle at phase change at the lower comparison frequency is usually called "zone" while a complete cycle of phase change at the aforementioned common comparison frequency is called a lane. There are a different number of lanes to the zone for each pair of stations, i.e. 18 lanes per zone for the master/green pair and 24 lanes per zone for the master/red pair. Thus the scale of the hyperbolic co-ordinates obtained from a fine comparison varies according to the pair of signals compared. In order to make addition, subtraction or other manipulation of the hyperbolic co-ordinates convenient and in order to drive an automatic chart display it is necessary, as is explained in the British patent specification No. 665,135 to convert the angle $\alpha$ into a zone fraction. This expresses the various quantities to the same scale. One convenient way of converting the angle $\alpha$ into a corresponding zone fraction (the fraction of a complete cycle of phase change at the coarse comparison frequency) is to multiply the angle $\alpha$ by the number of lanes in a zone and, if required, to divide the result by a fixed scale factor.

The present invention permits alternately stopping and starting the rotor circuit after the inputs have been set, the length of each period of intermittent oscillation of the rotor circuit being proportional to the number of lanes in a zone for the two stations whose signals provide said sine and cosine signals. The means for alternately stopping and starting the rotor circuit would be adjustable in accordance with the signals selected for digitising; as described more particularly hereinafter, the number $n$ counted by the counter would, in this mode of operation, be representative of $\alpha$ multiplied by the number of lanes in a zone, in the same way as it would have been representative of $\alpha$ without the intermittent operation.

According to this aspect of the invention, a receiver for a phase comparison radio navigation system, of the kind in which radio frequency signals that are different harmonics of a fundamental frequency are normally radiated in fixed phase relation from spaced transmitting stations, comprises means for bringing a pair of received signals to a common comparison frequency which is a harmonic of the fundamental frequency, phase discriminating means responsive to the phase angle between the said pair of signals at the comparison frequency and to provide two electrical signals whose amplitudes represent respectively in magnitude and sign the sine and cosine of said angle, a rotor circuit having two integrators in series with an inverter to form a closed oscillatory circuit, simultaneously operable switching means for applying said electrical signals to set the voltage levels in the rotor circuit at the outputs of the two integrators, a digital counter, means for alternately stopping and starting the rotor circuit after the inputs have been set so that it intermittently oscillates, the length of each period of oscillation being proportional to the ratio of the said comparison frequency and the said fundamental frequency, means operative to feed, after the inputs have been set, pulses to the counter in synchronism with the periods of oscillation, the counter being arranged to increment by an equal number in response to each pulse, and means inhibiting the counter from responding to said pulses when a point in the rotor circuit passes through a predetermined reference condition, and selectable control means each arranged, when selected, to control the rotor circuit to have a respective length of oscillation period.

It should be made clear that the present invention, in its broad aspect, is not confined to use in the specific system described above; it would be applicable in any phase comparison radio navigation system in which a receiver for the system produces electrical signals representing the sine and cosine of an angle in analogue form and in which it is desired to obtain said angle in digital form.

The invention will now be more particularly described with reference to the accompanying drawings in which:

FIGURE 1 is a diagram illustrating a chain of transwhen set, provides a continuous gate-opening output to an input of an AND gate 49. To the other input of the AND gate is fed the output of a clock pulse generator 50 providing clock pulses, which for the present will be assumed to be at a regular repetition rate. The output from the AND gate 49 is fed to a digital counter 51, which might be a binary counter having, for the sake of example, ten stages, being thereby capable of counting from 0 to $2^{10}-1$ (1023). The repetition rate of the clock pulses is made such that the counter 51 makes a complete cycle of counting in the time T, which, it will be recalled, is the normal period of the rotor circuit 30.

Reference will now be made to FIGURE 4 to explain the operation of the rotor circuit. FIGURE 4 is a phasor diagram in which the phasor OR has a magnitude V, the angle that OR makes with axis OX, which axis represents zero phase angle α, representing the angle α obtained by the comparison of the two radio frequency signals at the common comparison frequency. The lines $V_1$ and $V_2$ represent the values at the outputs of integrators 31 and 31a in FIGURE 3 at any instant and it will be seen that these represent the projections of the phasor OR on to the Y and X axes respectively.

As is fully explained in our prior British patent specification No. 873,999, by applying the signals $V_1$ and $V_2$ to the outputs of the two integrators the oscillation of the rotor circuit, which is represented by the rotation of the vector OR, about the point 0, in the plane of the paper starts at the values determined by the vector OR and continues, when the setting signals are removed with the voltages $V_1$ and $V_2$ being given at any instant by V sin α and V cos α.

If the gain of the inverter is made non-unity, the locus of the point R becomes elliptical. Since the present invention relies on, in effect, detecting an appropriate phase of OR, a change to an elliptical locus will not usually matter.

The setting of the sine and cosine signals into the rotor circuit is accomplished by operating the start circuit 47. This closes simultaneously switches 43, 44 and 45 for a period long enough for the capacitors integrating to be charged. When this is done, the values V sin α and V cos α are set into the outputs of the integrators 31 and 31a. Although other arrangements are possible, such as uncoupling the feedback capacitors 34 and 34a while reading in takes place, it is more convenient to operate in the manner just described.

As the same digitiser is used for digitising all the sine and cosine signals from all the phase comparisons, there may be an input resistor for each of the (usually six) signals, with further switches constituted by various poles of the switch 25 selecting the pair desired to be digitised.

At the end of the period when the rotor circuit has its inputs "set," the bistable circuit 48 will have been "set" so that the clock pulse generator 50 begins to feed pulses into the counter 51 at a regular rate. Coupled to the outputs of the amplifiers is the "reset" input of the bistable 48 through a comparator circuit 53. This circuit is arranged to provide an output pulse to "reset" the bistable circuit 48 as the phase of the rotor circuit reaches a predetermined value. It will be seen by reference to FIGURE 4 that this may correspond to the value $a=0$. At this time the counter is stopped and the number $n$ in the counter represents the angle α. More specifically, the ratio of $n$ to the maximum count (1024) of the counter equals α/2π in the usual mode of operation; as has been explained hereinbefore it may be required that a number $n^1$ in the counter should be the complement of the number $n$ (i.e. $N-n$) or the number $n$ plus a fixed value. The contents of the counter may be read out into a store 52 having ten storage locations and may be subsequently utilised in the computer 29. Of course, the store may form part of the computer 29 and the reading out of the digital values in the counter 51 may be under the control of the computer 29.

The comparator circuit 53 may comprise two separate voltage comparators, one comparing the voltages at the output of the integrator 31 (for example) with a zero reference voltage and producing an output signal when equality is detected, and the other producing an output signal when the output of the other integrator is positive, the output signals being fed to an AND gate whose output, if any, is fed to the appropriate input of the bistable 48. The example just described is particularly convenient when the count is to be stopped at one of the instants in the rotor circuit's circle when the output of an integrator is zero and distinguishes between the two such instants in a cycle. Other arrangements, are possible.

To ensure that the amplitude of the oscillation of the rotor circuit is substantially constant over one cycle, the oscillator loop must consist of two virtually perfect 90° phase shift elements together with the 180° phase shift element constituted by the inverter. In order that the integrators (or, in an alternative embodiment, of the differentiators) each provide a 90° phase shift it is necessary that the integrators be of an almost infinite Q and their transfer impedances be very high. The bias current necessary for the input stage of each amplifier can only be conveniently supplied from the output of the amplifier. A simple resistive feedback path providing the bias current would spoil the Q of the circuit. By decoupling this feedback path i.e. by the provision of the capacitors 42 or 42a the input bias current is almost 90° out of phase with the output voltage, which is as the capacitor feedback current. Accordingly the Q of the circuit is not materially affected by the provision of the feedback resistors 40, 41 and 40a, 41a.

Consideration will now be given to the conversion of the digitised phase angle into the aforementioned zone fraction. It might be possible to substitute different values of $k$ by providing alternative differently valued feedback resistors 37 or 38 to achieve the required result. However, a similar result can be conveniently achieved by alternately opening and closing the switch 39. By varying the open time of the switch in one cycle of switch operation, the angle through which the oscillator can sweep in each cycle of switch operation alters. It will be apparent that it is necessary to multiply the angle α by the ratio of the frequency at which it was determined to the common comparison frequency in order that the zone fraction is always expressed with reference to a single (low) frequency. For this purpose monostable circuits 53, 54 and 55 and a switch 39 are used although a single monostable circuit having three selectable periods would be suitable. In FIGURE 3, by closing switch 54a, 55a or 56a the clock pulses from the clock pulse generator 50 may be fed to any one of the monostables 54, 55 or 56. The period of the monostables is shorter than the period between successive clock pulses and the ratio of the periods of the monostables is selected to be 18:24:30. In this mode of operation the switch 39 will normally be closed unless it is opened by an output pulse from the respective monostable. It will stay open until the pulse from the monostable ceases. It will be seen that instead of being able to oscillate continuously the rotor circuit can only advance in phase during the time which the switch 39 is open. The amount of phase increment is proportional to the period of the monostable that is controlling the switch 39. Accordingly, the shorter the switch is open in each cycle the larger proportionately the number of monostable periods the rotor circuit takes to change in phase from the input angle to the reference value. At the same time, however, the counter is at a rate determined by the rate of occurrence of the periods of phase increment of the oscillator circuit. Accordingly, the number stored in the counter at the end of counting will be the same whatever period is selected: that is, the number stored will represent the aforementioned zone fraction.

It will be apparent that where the rotor circuit is controlled by the monostable devices the clock rate need not be regular, since the counter 51 only counts when a monostable is causing the rotor circuit to continue its oscillatory cycle.

It may be possible to control the counting of the counter by providing any convenient device which can produce an output signal each time the phase of the oscillation of the rotor circuit passes through each of a plurality of equally spaced angular positions. The output signals could then each be used for operating the counter to count a fixed number of units.

In FIGURE 3, the potentials applied to terminals 26 and 27 are such as will make the rotor circuit oscillate in the sense denoted by anticlockwise rotation of the vector OR in FIGURE 4. It is often more convenient to provide oscillation in the opposite sense: for this the potentials should be (−sin) and (−cos) respectively.

I claim:
1. A receiver for a phase comparison radio navigation system, which receiver includes phase discriminating means and is adapted to produce, by comparing the phases of received radio frequency signals, two electrical signals representing respectively both in magnitude and sign the sine and cosine of an angle, wherein there are provided a rotor circuit, simultaneously operable switching means for applying said electrical signals to set the voltage levels in the rotor circuit at the outputs of the two operational amplifiers therein, a digital counter, means for starting the counter for counting when said electrical signals are applied to said voltage levels, means for stopping the counting by the counter when a point in the rotor circuit passes through a predetermined reference condition, and control means for ensuring that each incremental numerical change in the counter corresponds to an incremental change in the phase of the oscillation of the rotor circuit, whereby the number counted by the counter between the starting and stopping of its counting is representative of said angle.

2. A receiver as claimed in claim 1 wherein the rotor circuit is arranged to oscillate without interruption after the counter is started and the counter is arranged to count at a regular rate.

3. A receiver as claimed in claim 2 wherein means are provided to feed regular clock pulses to the counter to cause the counter to count.

4. A receiver as claimed in claim 1 wherein means are provided for alternately stopping and starting the rotor circuit after the inputs have been set so that it intermittently oscillates, the lengths of each period of oscillation being equal and the counter being arranged only to count during said periods and to count an equal number of units during each successive period.

5. A receiver as claimed in claim 1 wherein the rotor circuit comprises two integrators arranged in series with an inverter to form a closed oscillatory circuit.

6. A receiver for a phase comparison radio navigation system, of the kind in which radio frequency signals that are different harmonics of a fundamental frequency are normally radiated in fixed phase relation from spaced transmitting stations, the receiver comprising means for bringing a pair of received signals to a common comparison frequency which is a harmonic of the fundamental frequency, phase discriminating means responsive to the phase angle between the said pair of signals at the comparison frequency and to provide two electrical signals whose amplitudes represent respectively, in magnitude and sign, the sine and cosine of said angle, a rotor circuit having two integrators in series with an inverter to form a closed oscillatory circuit, simultaneously operable switching means for applying said electrical signals to set the voltage levels in the rotor circuit at the outputs of the two integrators, a digital counter, means for alternately stopping and starting the rotor circuit after the inputs have been set so that it intermittently oscillates, the length of each period of oscillation being proportional to the ratio of the said comparison frequency and the said fundamental frequency, means operative to feed, after the inputs have been set, pulses to the counter in synchronism with the periods of oscillation, the counter being arranged to increment by an equal number in response to each pulse, means inhibiting the counter from responding to said pulses when a point in the rotor circuit passes through a predetermined reference condition, and selectable control means each arranged, when selected, to control the rotor circuit to have a respective length of oscillation period.

7. A receiver as claimed in claim 6 wherein the means for alternately stopping and starting the rotor circuit comprises a plurality of monostable circuits having different timing periods, the monostable circuits being responsive to each of said pulses to allow the inverter to operate, the inverter being otherwise inoperative.

8. A receiver as claimed in claim 6 wherein the means for applying the electrical signals to set the voltage levels comprises for each integrator an additional, resistive, feedback circuit and an additional input resistor for coupling a respective one of the electrical signals to the input summing junction of the integrator through a respective switch, the switches being simultaneously operable.

9. A receiver as claimed in claim 8 wherein means are associated with the switches to start the counter for counting when the switches are closed.

10. A receiver as claimed in claim 9 wherein the means for stopping the count includes a voltage responsive device arranged to provide an output signal when the voltage at said point passes through a predetermined value.

11. A receiver as claimed in claim 10 wherein the said value is zero.

12. A receiver as claimed in claim 10 wherein the voltage responsive device is a differential amplifier whose inputs are coupled to said point and to a reference voltage source.

References Cited

UNITED STATES PATENTS 3,270,343   8/1966   Bridges _____ 343—105

RODNEY D. BENNETT, Jr., *Primary Examiner.*

RICHARD E. BERGER, *Assistant Examiner.*